United States Patent
Hermans

(10) Patent No.: US 10,910,806 B2
(45) Date of Patent: Feb. 2, 2021

(54) INSTALLATION METHOD AND SYSTEM FOR OVERHEAD CONDUCTORS

(71) Applicant: LAMIFIL NV, Hemiksem (BE)

(72) Inventor: Peter Hermans, Oostend (BE)

(73) Assignee: LAMIFIL NV, Hemiksem (BE)

(*) Notice: Subject to any disclaimer, the term of this patent is extended or adjusted under 35 U.S.C. 154(b) by 0 days.

(21) Appl. No.: 16/084,341

(22) PCT Filed: Mar. 14, 2017

(86) PCT No.: PCT/IB2017/051476
§ 371 (c)(1),
(2) Date: Sep. 12, 2018

(87) PCT Pub. No.: WO2017/158516
PCT Pub. Date: Sep. 21, 2017

(65) Prior Publication Data
US 2019/0044314 A1 Feb. 7, 2019

(30) Foreign Application Priority Data
Mar. 14, 2016 (BE) .................................. 2016/5186

(51) Int. Cl.
*H02G 7/02* (2006.01)
*H02G 1/04* (2006.01)
*H02G 7/05* (2006.01)

(52) U.S. Cl.
CPC ................ *H02G 7/02* (2013.01); *H02G 1/04* (2013.01); *H02G 7/053* (2013.01)

(58) Field of Classification Search
CPC ........... H02G 7/02; H02G 1/04; H02G 7/053; H02G 7/00; H02G 7/04; H02G 7/05; H02G 7/06; H02G 7/14

USPC ........... 174/40 TD, 40 R, 42, 43, 44, 45 TD, 174/40 CC, 68.1, 68.3; 248/49, 68.1, 63, 248/61
See application file for complete search history.

(56) References Cited

U.S. PATENT DOCUMENTS

| | | | | |
|---|---|---|---|---|
| 3,007,243 A | * | 11/1961 | Peterson | D07B 7/187 174/42 |
| 3,716,650 A | * | 2/1973 | de Mecquenem | H02G 7/12 174/42 |
| 4,360,177 A | * | 11/1982 | Dulhunty | H02G 7/053 174/40 R |

(Continued)

FOREIGN PATENT DOCUMENTS

| | | |
|---|---|---|
| CH | 179219 A | 8/1935 |
| EP | 2367247 A1 | 9/2011 |
| JP | H01185119 A | 7/1989 |

OTHER PUBLICATIONS

Belgian Search Report from BE Application No. 201605186, dated Nov. 1, 2016.

(Continued)

*Primary Examiner* — Angel R Estrada
(74) *Attorney, Agent, or Firm* — Workman Nydegger

(57) ABSTRACT

A method for positioning a conductor for an overhead energy transport, the obtaining of a conductor with an elongate core and an elongate sheath situated around the elongate core. The method comprises the step of fixing the elongate sheath to the elongate core at a position which is not at the ends of the conductor, by means of at least one clamping piece.

20 Claims, 10 Drawing Sheets

(56) References Cited

U.S. PATENT DOCUMENTS

| | | | | |
|---|---|---|---|---|
| 4,385,201 A | * | 5/1983 | Nigol | H02G 7/14 |
| | | | | 174/42 |
| 4,568,794 A | | 2/1986 | Kumamoto et al. | |
| 4,791,237 A | * | 12/1988 | Sherman | H01R 4/646 |
| | | | | 174/40 R |
| 5,435,507 A | * | 7/1995 | Murphy | F16L 3/10 |
| | | | | 174/40 R |
| 6,595,472 B1 | * | 7/2003 | Pisczak | H02G 7/053 |
| | | | | 248/74.1 |
| 8,309,846 B2 | * | 11/2012 | Espindola | H02G 7/14 |
| | | | | 174/40 CC |
| 9,948,080 B2 | * | 4/2018 | Bentley | H02G 7/125 |

OTHER PUBLICATIONS

International Search Report from PCT Application No. PCT/IB2017/051476, dated Aug. 28, 2017.

* cited by examiner

INSTALLATION METHOD AND SYSTEM FOR OVERHEAD CONDUCTORS

FIELD OF THE INVENTION

This invention relates in general to overhead energy transport. More specifically, the present invention relates to methods and systems for the installation or repair of conductors, such as for example cables for catenary lines for trains, overhead high-voltage cables for energy transport and energy distribution, and also to conductors obtained in this fashion.

BACKGROUND OF THE INVENTION

Bare cables which are suspended between two or more suspension points become longer as the temperature rises. This means that the cables sag further, which can have annoying consequences. The cables may be heated by direct sunlight or by other heat radiation. In the case of conductors, heating is also a direct consequence of Joule's heat losses caused by an electrical current.

If the sag of the cable becomes greater, it may occur that the clear height below the conductor becomes too small (high-voltage cables, catenary lines for trains) or that the tension in the conductor becomes too low (catenary lines for trains, clamping cables).

In the case of overhead high-voltage conductors, this problem arises in particular but not exclusively for high-temperature conductors. A direct solution for high-voltage cables is the use of gap conductors, wherein the core and the sheath of the cables are separated by an air gap. The installation of these cables is however accompanied by very specific problems, whereby the time for installing the cable is extended and repair becomes a very complicated task.

U.S. Pat. No. 4,568,794 describes a method for suspending a gap-type conductor using a clamp. CH179219, JP-01185119 and EP2367247 describe a clamp for a conductor.

There is therefore a need for good and efficient methods for installing conductors such as high-voltage cables, and for methods for repairing breaks in said conductors.

SUMMARY OF THE INVENTION

It is an object of embodiments of the present invention to provide good methods and systems for installing and/or repairing conductors for overhead connections for energy transport.

It is an advantage of embodiments of the present invention that good methods and systems are provided for installing and/or repairing conductors, such as for example catenary lines for trains, overhead high-voltage cables for energy transport or energy distribution, and other applications.

It is an advantage of embodiments of the present invention that the methods and systems allow easy detection and repair of broken cables.

It is an advantage of embodiments of the present invention that the length of the cable to be replaced on breakage is limited.

It is an advantage of embodiments of the present invention that the ancillary items required to install the cable are simple mechanical components which can be produced using standard production methods.

It is an advantage of embodiments of the present invention that the conductor may be installed in a time interval in which a conventional conductor can be installed, whereby the time loss associated with the installation of gap conductors is eliminated.

It is an advantage of embodiments of the present invention that the conductor may be installed in unlimited lengths.

It is an advantage of embodiments of the present invention that the repair of a conductor is simplified such that this can be done as easily as with conventional conductors.

This objective is achieved by a product or a method according to embodiments of the present invention.

The present invention concerns a method for installing a conductor for an overhead energy transport, obtaining a conductor with an elongate core and an elongate sheath which surrounds the elongate core, wherein the method comprises the step of immobilising the elongate core on the elongate sheath in a position which does not lie at the ends of the conductor on installation or fixing. The immobilisation takes place by means of at least one clamping piece or one stopper. It is an advantage of embodiments of the present invention that the tension difference between the core and the sheath of the conductor is split over shorter lengths of the cable. It is also an advantage of the present invention that this technique may be applied to different types of conductors.

The method may also comprise the step of immobilising or fixing by means of at least two clamping pieces and/or stoppers which are not situated at the ends of the conductor during production of the conductor. The at least two clamping pieces and/or stoppers may be spaced substantially equidistantly over the length of the conductor. Alternatively, the two clamping pieces and/or stoppers may also be spaced non-equidistantly over the length of the conductor. It is an advantage of embodiments of the present invention that the length of the conductor which must be replaced on breakage may be selected by adapting the number of clamping pieces.

The step of immobilising or fixing the elongate sheath to the elongate core at a position not at the ends of the conductor may take place during production of the conductor.

The conductor may comprise an air gap between the elongate core and the elongate sheath.

For immobilising or fixing during production, the elongate core is first brought to tension.

In the resulting conductor, in non-tensioned state, the sheath may be pushed away from the core by means of a filler in a gap between the core and the sheath, or the sheath may consist of a set of wires formed such that the wires do not adjoin. On immobilisation or fixing during production, the elongate core should in this case not first be brought to tension.

The step of immobilising or fixing the elongate sheath to the elongate core at a position not at the ends of the conductor may take place during installation of the conductor.

The immobilisation may comprise the use of a stopper arranged on the core.

The immobilisation may comprise the use of the clamp arranged on the sheath.

The method may comprise the following steps:
clamping a conductor at a first end in order to fix the elongate core and the elongate sheath,
tensioning the elongate core at the second end of the conductor by means of a temporary clamp until the conductor hangs at the correct height,
after the elongate sheath has come to rest, immobilising or fixing the elongate sheath to the elongate core, for example with a fixed stopper on the sheath or on the core, or a loose or temporary clamp, or the placing of a temporary clamp on the sheath in order to hold the cable under tension, cutting the cable to length, and positioning an end clamp for final fixing of the conductor at the second end.

The immobilising or fixing of the elongate sheath to the elongate core in a position not at the ends of the conductor may take place after the elongate sheath has come to rest.

In the resulting conductor, in non-tensioned state, the sheath may be pushed away from the core by means of a filler in a gap between the core and the sheath, or the sheath may consist of a set of wires formed so that the wires do not adjoin, and the method may comprise the following steps:

clamping a conductor at a first end in order to immobilise the elongate core and the elongate sheath, gripping the elongate sheath at the second end and cutting the conductor to the correct length, final clamping of the elongate core and the elongate sheath at the second end of the conductor, and tensioning the conductor until the wires of the sheath adjoin.

The above-mentioned fixing by means of at least one clamping piece not at a position at the ends of the conductor may take place before suspension of the conductor or after tensioning of the conductor.

In both cases, the conductors may be installed without first being tensioned. However, the methods may also comprise a step of first tensioning.

In the resulting conductor, in non-tensioned state, the sheath may be pushed away from the core by means of a filler in a gap between the core and the sheath, and the method may comprise the following steps:

clamping a conductor at a first end in order to immobilise the elongate core and the elongate sheath, gripping the elongate sheath at the second end and cutting the conductor to the correct length, final clamping of the elongate core and the elongate sheath at the second end of the conductor, and tensioning the conductor until the sheath runs parallel to the core.

In the resulting conductor, in the non-tensioned state, the sheath consisting of a set of wires may be formed so that the wires do not adjoin and the method may comprise the following steps:

clamping a conductor at a first end in order to fix the elongate sheath to the elongate core, gripping the elongate sheath at the second end and cutting the conductor to the correct length, and final clamping of the elongate core and the elongate sheath at the second end of the conductor, and tensioning the conductor until the wires of the sheath adjoin neatly.

The method may also comprise the following: unrolling the conductor, gripping the elongate sheath and the core, and tensioning the conductor until the wires of the sheath adjoin neatly in order to determine the correct length of the conductor, and cutting the conductor to the correct length in the non-tensioned state.

Before determining the correct length of the conductor, the sheath and the core may be fixed after tensioning by means of a bush.

The above-mentioned fixing by means of at least one clamping piece not at a position at the ends of the conductor may take place before tensioning of the conductor or after tensioning of the conductor.

In one aspect, the present invention may also concern a method for repairing a break in the conductor for overhead energy transport, wherein the conductor comprises various clamping pieces on the conductor which are not situated at the end suspension points of the conductor, wherein the method comprises the step of replacing a part of the conductor between the clamping pieces between which the break in the conductor has occurred.

The repair method may also comprise the following steps: removing the damaged piece of conductor, and positioning a new piece of conductor between the two clamping pieces. This piece of conductor may already be prepared in advance with a coupling piece (pressed) on both end and a length, with pretensioned core or with loose wires or with a filler which pushes the wires towards the outside.

The present invention also concerns a conductor for overhead energy transport, the conductor comprising an elongate core and an elongate sheath situated around the elongate core, at least one clamping piece which, on use of the conductor, is clamped to the conductor such that the elongate core and the elongate sheath are attached to each other by the clamping piece, wherein the at least one clamping piece is not situated at the ends of the conductor.

It is an advantage of embodiments of the present invention that the tension difference between the core and the sheath of the conductor is divided over shorter lengths of the cable. This implies that the total tension differences are split into smaller tension differences distributed over shorter lengths.

The conductor may comprise several clamping pieces which are still clamped to the conductor during use of the conductor, i.e. after tensioning and suspension of the conductor, and which are not situated at the ends of the conductor, wherein the several clamping pieces are spaced substantially equidistantly over the length of the conductor. Alternatively, the clamping pieces may also be situated not spaced equidistantly.

It is an advantage of embodiments of the present invention that the maximum length of the conductor which must be replaced on breakage is limited to the length between two clamping pieces.

The elongate sheath may consist of a material selected from a copper, copper alloy, aluminium or aluminium alloy, and wherein the elongate core consists of a material selected from an Invar, metal matrix composite, polymer matrix composite, metal or steel.

It is an advantage of embodiments of the present invention that the technique may be applied independently of the materials used.

An air gap may be present between the core and the sheath. It is an advantage of embodiments of the present invention that the methods and systems may be applied to the significant class of conductors with an air gap between the core and the sheath, known as gap conductors.

The elongate sheath may comprise one or more layers of conductive wires.

At least one of the layers of conductive wires may comprise wires which are trapezoid or Z-shaped.

Additional layers may be provided around the sheath so that the conductor forms a cable.

In a further aspect, the present invention concerns a clamping piece for use with a conductor for overhead energy transport, wherein the clamping piece is suitable for fixing, at a position away from the ends of the conductor, an elongate core of the conductor and an elongate sheath of the conductor situated around the elongate core.

In one aspect, the present invention also concerns the use of a clamping piece as described above for distributing tension differences between the core and the sheath over different pieces of a conductor.

Specific and advantageous aspects of the invention are contained in the attached independent and dependent claims. Features of the dependent claims may be combined with features of the independent claims, and with features of other dependent claims as appropriate, and not merely as expressly presented in the claims.

These and other aspects of the invention will become clear and are explained with reference to the embodiment(s) described below.

Figure 1:
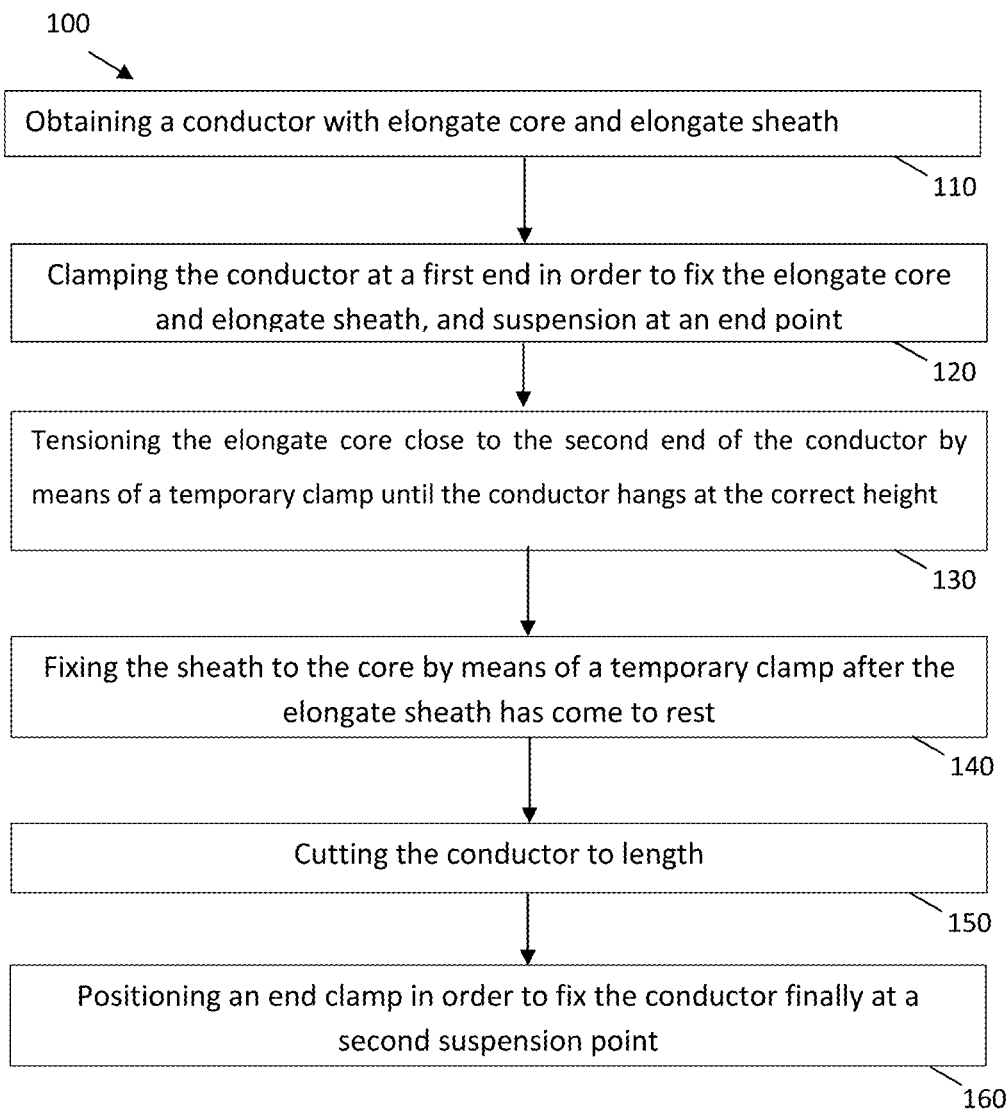
FIGS. 1 to 3 illustrate three methods for positioning a conductor for overhead transport in accordance with embodiments of the present invention.
Figure 2:
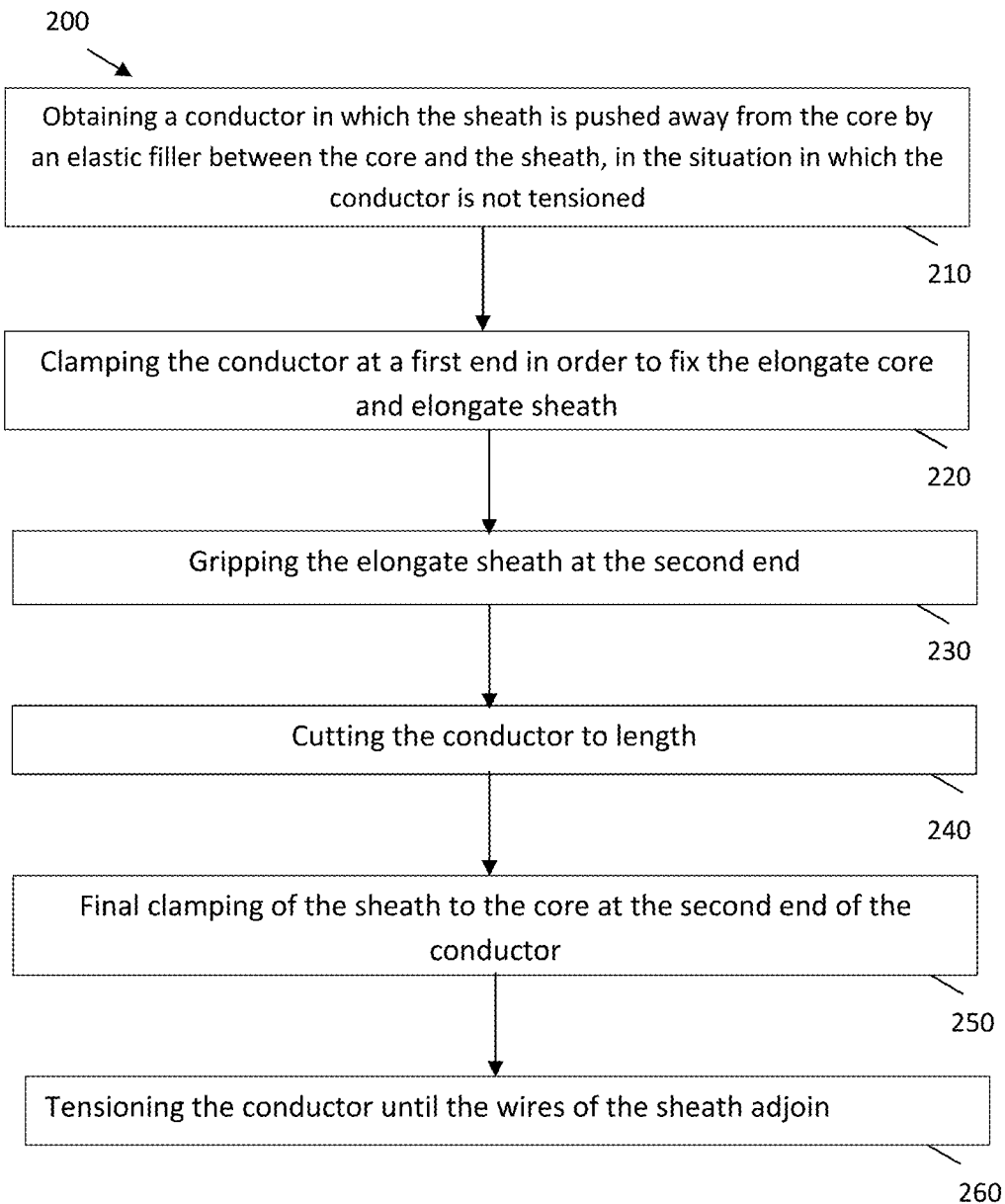
Figure 3:
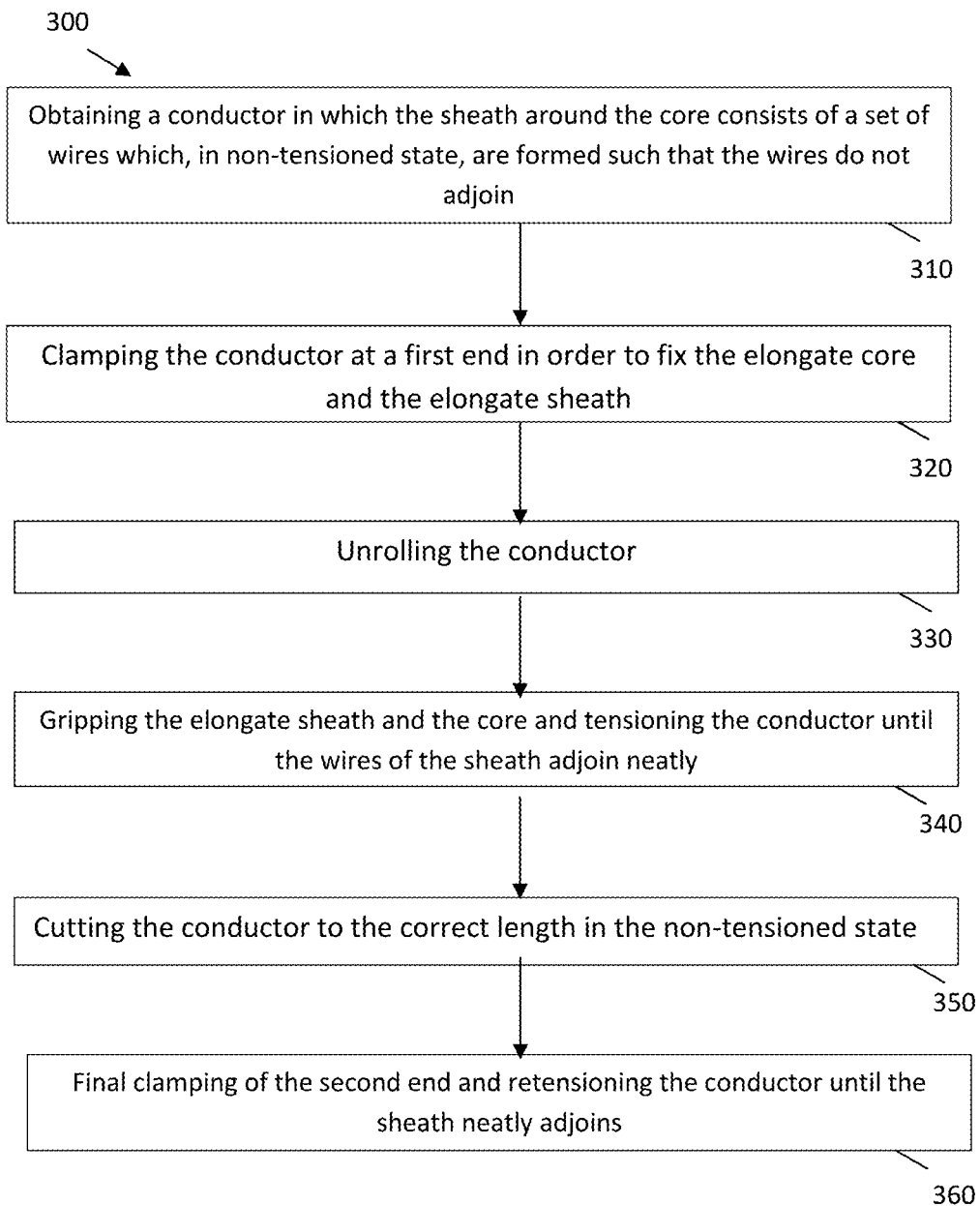

The figures are purely diagrammatic and non-limitative. In the figures, the dimensions of some components may be exaggerated and not depicted to scale for illustrative purposes.

Reference numbers in the claims should not be interpreted as limiting the scope of protection. In the various figures, the same reference numbers refer to the same or equivalent elements.

DETAILED DESCRIPTION OF ILLUSTRATIVE EMBODIMENTS

The present invention will be described in relation to particular embodiments and with reference to specific drawings, however the invention is not limited thereto but is limited purely by the claims. The drawings described are purely diagrammatic and not restrictive. In the drawings, the dimensions of some elements may be enlarged for illustrative purposes and not drawn to scale. The dimensions and relative dimensions sometimes may not correlate to the actual practical implementation of the invention.

Furthermore, the terms "first", "second", "third" and similar in the description and claims are used to distinguish equivalent elements and not necessarily to describe an order, either in time or space or in priority or in any other way. It should be understood that the terms used in this way may under certain circumstances be interchangeable, and that the embodiments of the invention described herein are suitable for functioning in different orders than described or shown here.

In addition, the terms "top", "bottom", "above", "before" and similar are used in the description and claims for descriptive purposes and not necessarily to describe relative positions. It should be understood that the terms which are so used may under certain circumstances be mutually interchanged and that the embodiments of the invention described herein are also suitable for functioning in other orientations than described or shown here.

It should be noted that the term "comprises" as used in the claims should not be interpreted as restricted to the means described thereafter; this term does not exclude other elements or steps. It should be interpreted as specifying the presence of the specified features, values, steps or components to which reference is made, but does not exclude the presence or addition of one or more other features, values, steps or components or groups thereof. Hence, the scope of the expression "a device comprising means A and B" should not be limited to devices which consist merely of components A and B. It means that in relation to the present invention, A and B are the only relevant components of the device.

Reference throughout this specification to "one embodiment" or "an embodiment" means that a specific feature, structure or characteristic described in connection with the embodiment is included in at least one embodiment of the present invention. Hence the expressions "in one embodiment" or "in an embodiment" used at various points throughout the specification need not necessarily refer in each case to the same embodiment, but may well do so. Also, the specific features, structures or characteristics may be combined in any suitable manner, as will be clear to the person skilled in the art on the basis of this publication, in one or more embodiments.

Similarly, it should be appreciated that in the description of exemplary embodiments of the invention, various features of the invention are sometimes grouped together in a single embodiment, figure or description thereof, with the purpose of streamlining the disclosure and assisting the comprehension of one or more of the different inventive aspects. This method of disclosure should not be interpreted as a reflection of an intention that the invention requires more features than explicitly stated in each claim. Rather, as the present claims reflect, inventive aspects lie in less than all features of a single, previously disclosed embodiment. Hence, the claims following the detailed description are hereby explicitly included in this detailed description, with each claim standing alone as a separate embodiment of this invention.

Furthermore, while some embodiments described herein comprise some but not other features included in other embodiments, combinations of features of different embodiments are considered to lie within the scope of the invention and form these different embodiments, as will be understood by the person skilled in the art. For example, in the claims which follow, any of the embodiments described may be used in any combination.

In the present description, numerous specific details are described. It should also be understood that embodiments of the invention may be executed without these specific details. In other cases, well-known methods, structures and techniques are not presented in detail in order to keep this description concise.

Where embodiments of the present invention refer to the core, or refer to "gap conductors", reference is made to a conductor with a central core which is typically the strength element mechanically separate from an enveloping element, which is typically the conductive material.

In a first aspect, the present invention concerns a method for positioning a conductor for overhead energy transport. The method is typically advantageous for installing energy transport conductors such as high-voltage cables. The method is also particularly useful for conductors based on the gap principle, wherein an air gap is provided between the core and the sheath of the conductor, although embodiments are not restricted thereto. In embodiments of the present invention, in a first step a conductor is obtained with an elongate core and an elongate sheath which surrounds the elongate core. This may be obtained by means of production or by acquisition of a conductor already produced. The method also comprises the fixing of the elongate sheath to the elongate core at a position which is not situated at the ends of the conductor, by means of at least one clamping piece.

In its broadest embodiment, the present embodiment thus comprises a method for positioning of a conductor, wherein at least one clamp is placed at a position which is not at that time at the end of the cable.

In some embodiments, the fixing of the elongate sheath to the elongate core may take place during production of the conductor. This is the case for example in the embodiments in which the difference in stretch and/or creep between the core and the sheath is already absorbed in advance by one or another mechanism in the conductor or its process, so that the clamps which are not situated at the ends provide good extra fixing points at which the strain on the sheath and the core due to the difference in stretch is limited. In these embodiments, the strain on the sheath and the core due to the difference in stretch and creep is thus evenly distributed over the length of the conductor. One example of such conductor is a conductor in which the space between the sheath and the core is filled with an elastic material which pushes the sheath outward when the conductor is not under tension, but which fills the desired spacing between the sheath and the core such that the sheath has no bulges relative to the core, or if several wires are used, so that the wires adjoin each other, wherein the core stands under the desired tension, i.e. the tension which should sit on the core when this is installed. Another example is a conductor in which the sheath consists of a set of conductive wires and wherein these wires do not adjoin when the conductor is not mechanically tensioned, but wherein the wires adjoin neatly and form a substantially closed sheath when the conductor is under mechanical tension, i.e. the mechanical tension which sits on the conductor when this is installed. In other embodiments, the clamps may also be positioned during production of the conductor, but for this during production of the conductor, the core is first brought to the mechanical tension as if the conductor were installed.

In some embodiments, at least one clamp is applied after production of the conductor, i.e. on installation of the conductor.

In some embodiments, the present invention concerns the use of several clamps which are not situated at the ends of the conductor. These several clamps may sit at equal distances from each other, for example equidistantly, or may sit at specific distances taking into account for example the attachment points of the conductor to the masts or towers of the installation, and/or taking into account for example spacing systems which hold the different conductors apart, etc. Also, it may deliberately be chosen not to position the clamps at equal distances from each other, for example in order not to introduce extra specific resonance. By way of illustration, various specific examples of embodiments will be described in more detail, although the invention is not restricted thereto.

In a first set of embodiments, a method is described wherein the placing of the cable comprises steps as indicated diagrammatically in FIG. 1. The method 100 here comprises a first step for obtaining 110 a conductor with an elongate core and an elongate sheath. An example of such a conductor may for example be a gap conductor, although embodiments are not restricted thereto. The obtaining 110 of such a conductor may comprise the production of such a conductor, but alternatively also the acquisition of a conductor from a stock so that an off-the-shelf conductor may be used. A second step 120 comprises the clamping of a conductor at a first end in order to fix the elongate core and the elongate sheath. For this, a standard end clamp may be used, as already used in existing installation techniques. Typically, such an end clamp may be provided to suspend the conductor at an end point where the conductor is used. Alternatively, a coupling piece may be used which connects two cables together. Another alternative may be the use of a stopper which is pressed thereon. The installation of the two ends at the same time may take place in symmetry relative to the centre clamp or stopper.

In a third step 130, the elongate core is tensioned close to the second end of the conductor by means of a temporary clamp until the conductor hangs at the correct height. For this, a temporary clamp may be used which for example is slightly shorter than an end clamp. Alternatively, a longer clamp may also be used.

In a fourth step 140, after the elongate sheath has come to rest, the sheath is immobilised relative to the core by means of a clamp. Such a clamp may be a press clamp which is typically permanently positioned, or may comprise a sleeve and a clamp which is typically fitted temporarily. It may be placed on the sheath or on the core. Then the conductor is gripped behind the clamp so that the end is freely accessible. The conductor is then cut to length 150. An end clamp 160 is then positioned for final fixing of the conductor at the second suspension point. By way of illustration, the diagrammatic plan of steps for the method is shown in FIG. 1. If additional clamps are used for fixing the elongate sheath to the elongate core at positions not at the ends of the conductor during installation, this is typically done after the elongate sheath has come to rest.

A second specific embodiment concerns a method 200 for positioning of a conductor, wherein the conductor is of the type in which, in non-tensioned state, the sheath is pushed away from the core by means of a filler in a gap between the core and the sheath. The method also comprises a step of obtaining 210 a conductor, but obtaining here specifically refers to the taking or making of a conductor in which the sheath is pushed away from the core by an elastic filler between the core and the sheath, in the situation in which the conductor is not tensioned. The method furthermore comprises the clamping 220 of a conductor at a first end in order to fix the elongate core and elongate sheath, the gripping 230 of the elongate sheath at the second end, and the cutting 240 of the conductor to the correct length. The method furthermore comprises also the final clamping 250 of the elongate core and elongate sheath at the second end of the conductor, and the tensioning 260 of the conductor until the wires of the sheath adjoin. The method typically comprises also the fixing by means of at least one clamping piece not at a position at the ends of the conductor, wherein the step takes place before tensioning of the conductor or after tensioning of the conductor. In the present method, the timing for the clamping is of less importance since the strain induced by creep or stretch is compensated locally in the conductor. The intermediate clamps may however further promote this local compensation.

In a third specific embodiment, the present invention concerns another method for installation of a conductor, wherein the conductor in this case consists of a core with a sheath surrounding this and comprising a set of wires which, in non-tensioned state, are formed such that the wires do not adjoin. The method 300 here comprises the obtaining 310 of such conductor. Furthermore, the method 300 comprises the clamping 320 of a conductor at a first end in order to fix the elongate sheath to the elongate core. The method also comprises the unrolling 330 of the conductor, the gripping 340 of the elongate sheath and the core, and the tensioning of the conductor until the wires of the sheath neatly adjoin, in order to determine the correct length of the conductor. Then the method comprises the cutting 350 of the conductor to the correct length in the non-tensioned state, and the final clamping 360 of the elongate core and the elongate sheath at the second end of the conductor, and then retensioning until the wires of the sheath neatly adjoin again. Before determining the correct length of the conductor, the sheath and the core may be fixed optionally after tensioning with a bush.

The use of at least one clamping piece for fixing not at a position at the ends of the conductor may, in the present embodiment, take place before tensioning of the conductor or after tensioning of the conductor. Again, the precise timing is of less importance since the strain induced by creep or stretch is more locally distributed.

In some embodiments, the immobilisation of elongate sheath relative to the core at a position which is not situated at the ends of the conductor on fixing, is obtained by providing a clamp (temporary or otherwise) on the sheath.

However, in other embodiments, the immobilisation of the elongate sheath relative to the core at a position which is not situated at the ends of the conductor is achieved by using a stopper which is attached to the core, for example by pressing or by bolting. The sheath can then no longer move forward when the tension diminishes, nor be pushed over the core if the sheath is gripped.

Figure 5A:
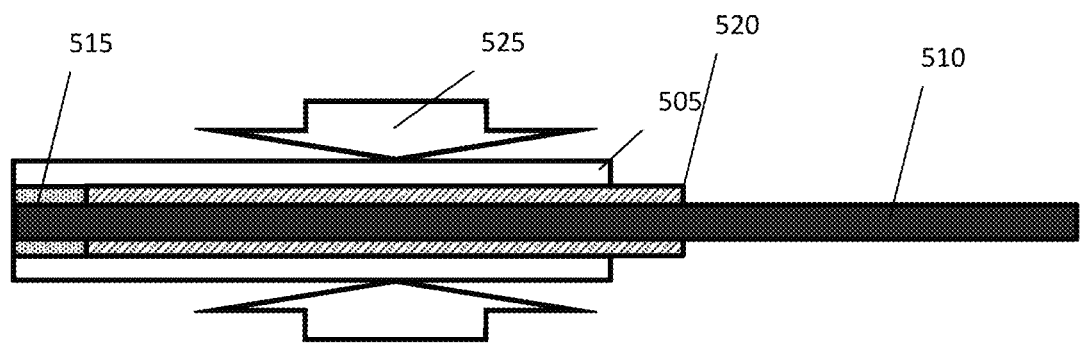
FIGS. 5a and 5b illustrate a clamping piece on the core, provided with a screw thread for later screwing of an eyelet. The clamping piece has a diameter which is smaller than the inner diameter of the sleeve of the definitive pressure clamp, so that this can be pushed over at any time of the installation, in accordance with embodiments of the present invention.
Figure 5B:
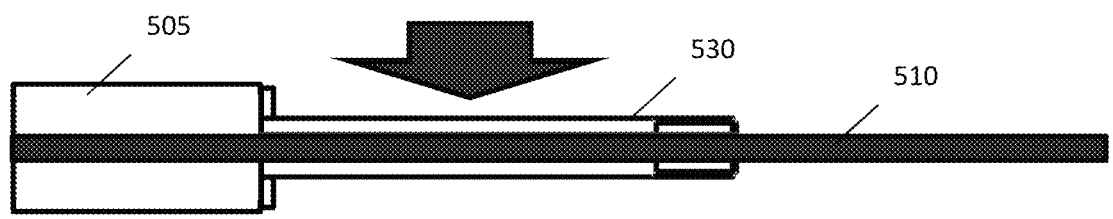
Figure 6:
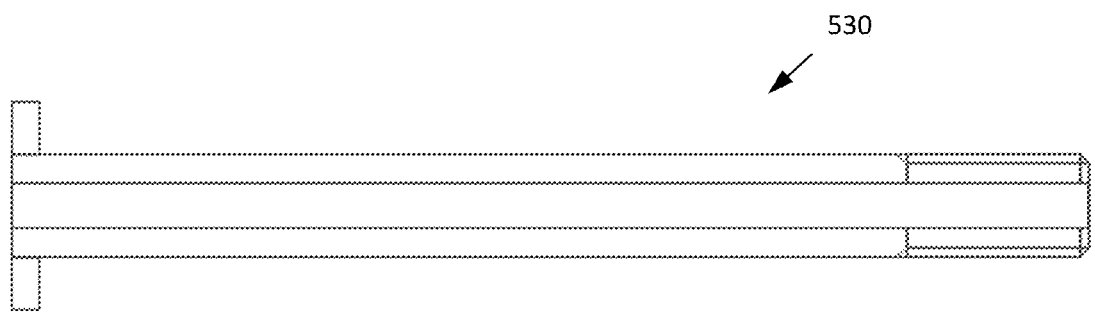
FIG. 6 illustrates the clamping piece according to one embodiment of the present invention.
Figure 7:
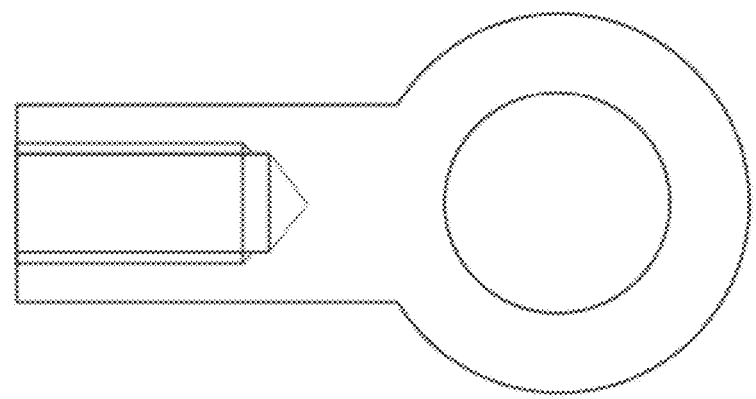
FIG. 7 illustrates the optional eyelet in accordance with one embodiment of the present invention.

In these embodiments, the sheath, for example an aluminium sheath, is immobilised relative to the core, for example a steel core, by pressing a stopper onto the core as shown in FIGS. 5a and 5b. FIG. 5a shows the cable with the sheath 505, the core 510, the gap 515, the sleeve 520 and a working clamp 525. FIG. 5b also shows the stopper 530. Such a stopper is then an alternative to the clamps on the sheath. FIG. 6 shows a diagrammatic depiction of a stopper (without this being pressed onto the core), and FIG. 7 shows a diagrammatic example of a coupling piece, in the present example an eyelet, which may be attached to the stopper in order definitively to suspend the cable thereat or couple this to another piece of cable. The stopper shown in FIG. 6 is an example of a stopper for a core, such as for example a steel core. In the centre, a hole is visible which the core will fill. Also visible are a collar for counter-holding the sheath, a part without screw thread which will be largely pressed on, and a piece with screw thread which may later serve for screwing on a coupling piece, for example an eyelet. Stoppers and coupling pieces may in fact for example be provided with an internal and external thread so they can be screwed together.

By way of illustration, an example is described below of an installation method in which optional and standard steps are described, embodiments not being restricted thereby. It is noted that although the examples sometimes refer to an aluminium sheath, the sheath may also be made of another material, and although in the examples sometimes a steel core is mentioned, the sheath may also be made of another material.

In the installation method, the cable is clamped at one end with an end clamp (or coupling piece).

In a following step, the cable may be pulled at the core at the other end with a temporary clamp. The steel core here hangs freely out of the temporary working clamps at one end, for example by around two metres. Alternatively, at the other end the core and sheath may be pulled. The sheath may then be cut loose and can move. Enough aluminium is removed to be able to grip the steel core with a temporary working clamp, and the original clamp is then removed.

In a further step, the sleeve of the final clamp is pushed over the steel core and then the stopper is placed on the core, for example a steel stopper, where applicable with a screw thread oriented towards the end of the cable.

Then another temporary clamp is placed behind the sleeve and the stopper, and the other temporary working clamp is removed again. The sleeve is pushed over the cable and the stopper is pressed onto the cable after the correct length has been determined.

In a following step, a temporary clamp may be positioned on the sheath as this can no longer move. Alternatively, the stopper may also be clamped. The core may now be cut to length, and a steel end clamp can be pressed on. Now the aluminium fitting can be pressed on. An alternative to this step is the use of the stopper which is provided with a screw thread, and the sleeve is pressed up to the stopper while the temporary clamp is still attached to the steel. The sheath is then gripped with a temporary working clamp and the steel core is cut to length, the eyelet of the end clamp is screwed on and the sleeve is pressed completely.

Other alternative installation methods are also possible. Thus the steel stopper may be pushed onto the core in advance when the conductor is pulled, so that less use of working clamps is required. This is also possible for the aluminium stopper so that a cylindrical stopper can be used. Another alternative is working with a stopper made of two halves. The latter is the preferred method for mounting in the middle of the cable after installation.

Figure 8:
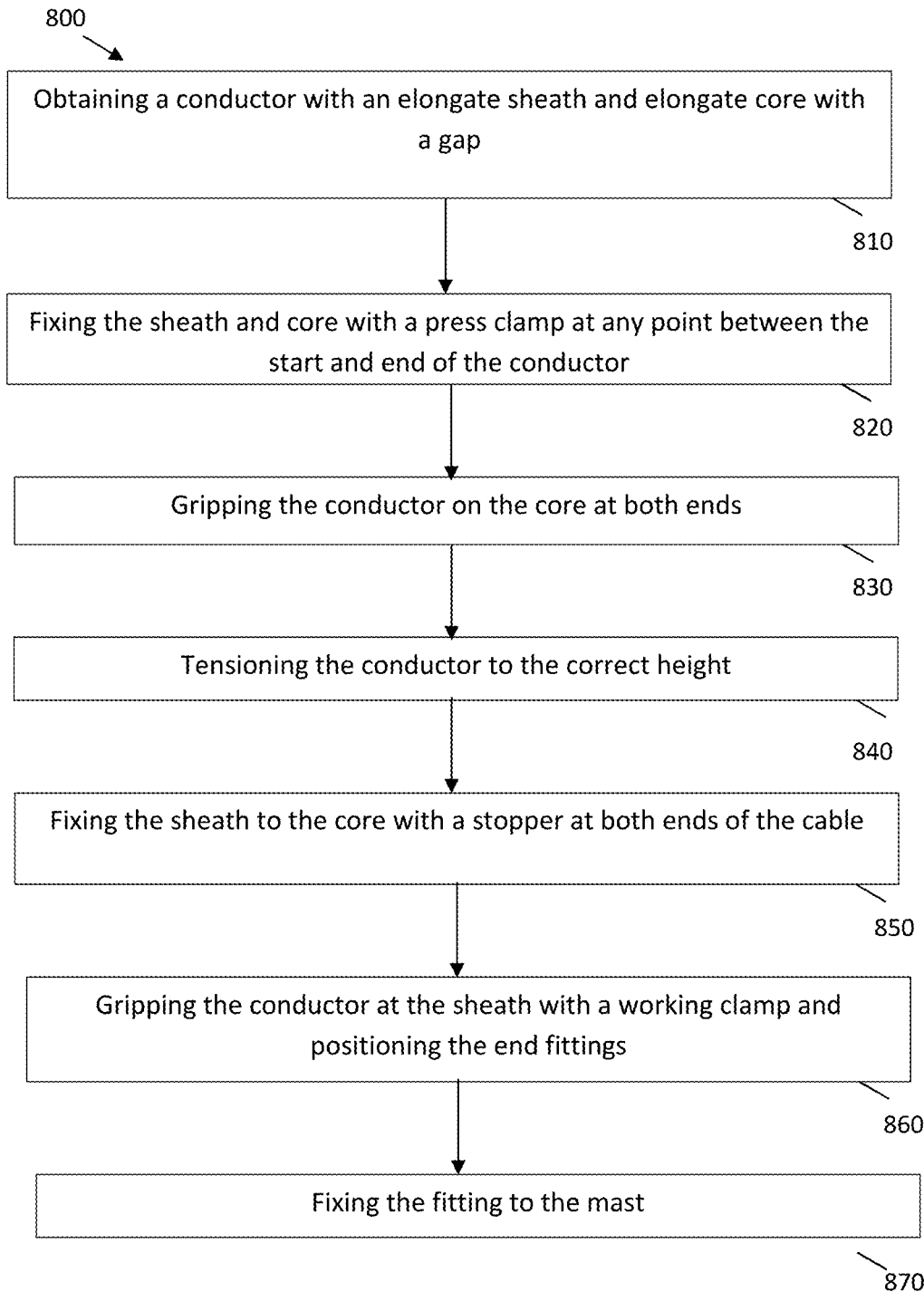
FIGS. 8 to 12 illustrate various methods for positioning a conductor for overhead transport in accordance with embodiments of the present invention.

Furthermore, by way of illustration, embodiments not being limited thereby, some exemplary installation methods will now be described with reference to FIGS. 8 to 12. FIG. 8 shows an installation method for a gap conductor. The method 800 comprises the obtaining 810 of a conductor with an elongate sheath and an elongate core, wherein a gap is present between the core and the sheath. The method 800 also comprises the fixing 820 of the sheath and the core with a press clamp at any point between the start and end of the conductor. In step 830, the conductor is gripped at the core at both ends. The conductor is then tensioned 840 to the correct height. The method furthermore comprises the fixing 850 of the sheath on the core with a stopper at both ends of the cable. In a following step 860, the conductor is gripped at the core with a working clamp and the end fittings positioned. Finally, the fittings 870 are attached to the mast.

Figure 9:
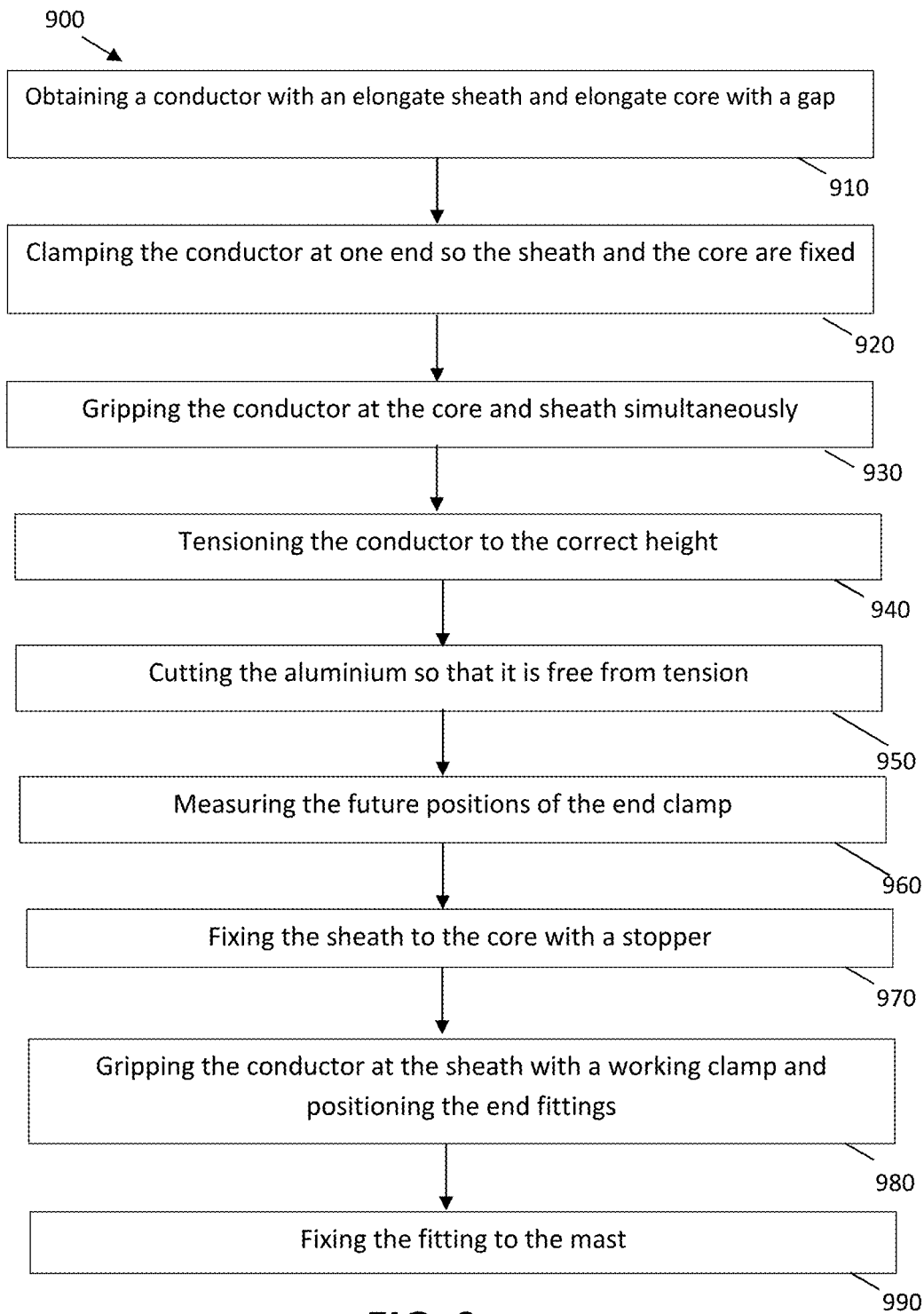

FIG. 9 describes an alternative installation method for a gap conductor. The method 900 comprises the obtaining 910 of a conductor with an elongate sheath and an elongate core, wherein a gap is present between the core and the sheath. The method 900 also comprises the clamping 920 of the conductor at one end so that the sheath and the core are fixed. In step 930, the conductor is gripped at the core and sheath at the same time. Then the conductor is tensioned 940 to the correct height. The method furthermore comprises cutting 950 the aluminium so that it is not under tension, and measuring 960 the future positions of the end clamp. The method 900 furthermore comprises the fixing 970 of the sheath to the core with a stopper. In a following step 980, the conductor is gripped at the core with a working clamp and the end fittings are positioned. Finally, the fittings 990 are attached to the mast.

Figure 10:
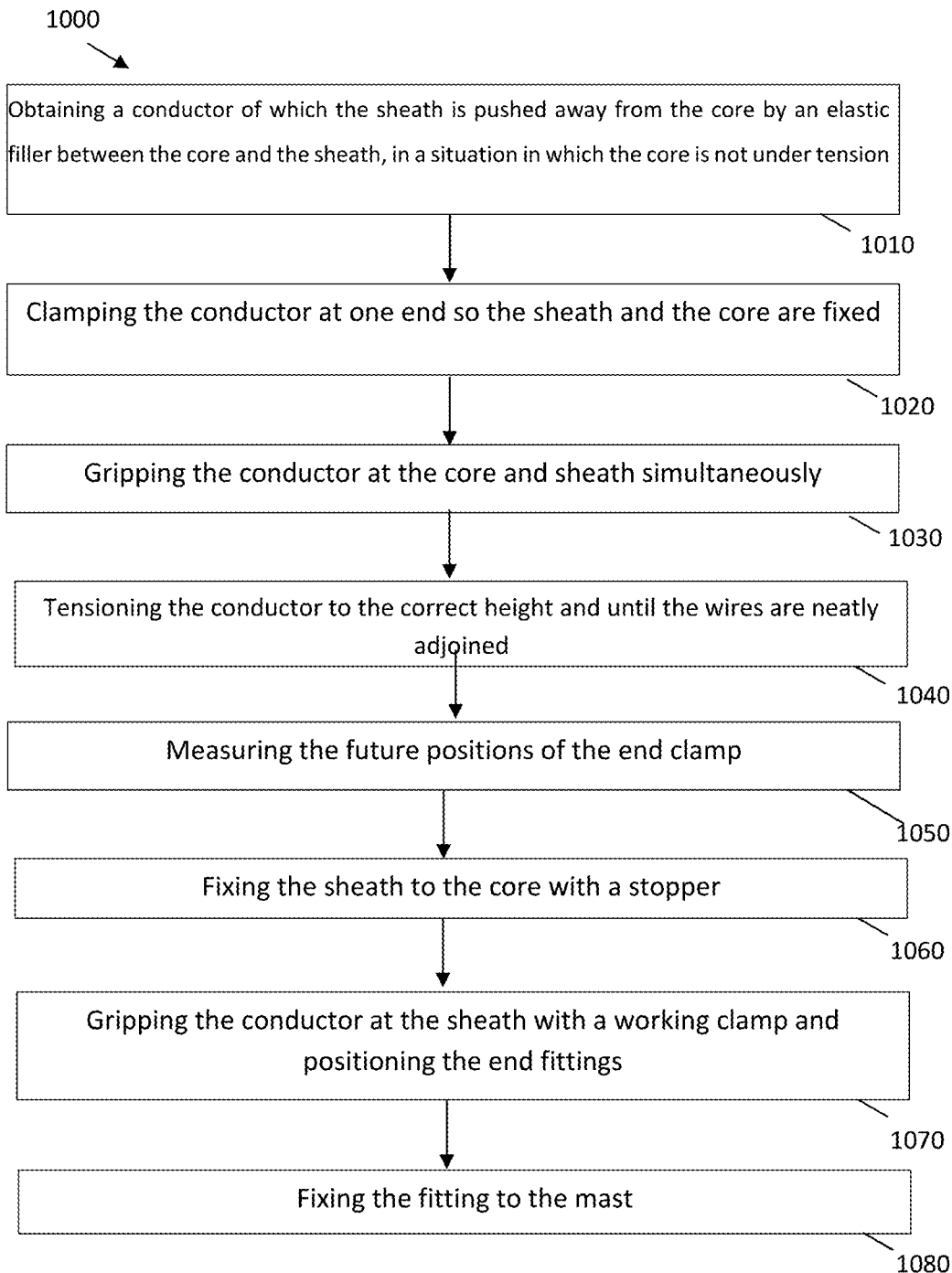

FIG. 10 describes another alternative installation method. The method 1000 comprises obtaining a conductor, the sheath of which is pushed away from the core by an elastic filler between the core and the sheath in a situation in which the core is not under tension. The method 1000 also comprises the clamping 1020 of the conductor at one end so that the sheath and the core are fixed. In step 1030, the conductor is gripped at the core and sheath simultaneously. Then the conductor is tensioned 1040 to the correct height. The method furthermore comprises the measuring 1050 of the future positions of the end clamp. The method 1000 furthermore comprises the gripping 1070 of the conductor at the sheath with a working clamp, and the positioning of the end fittings. In a following step 1080, the fitting is attached to the mast.

Figure 11:
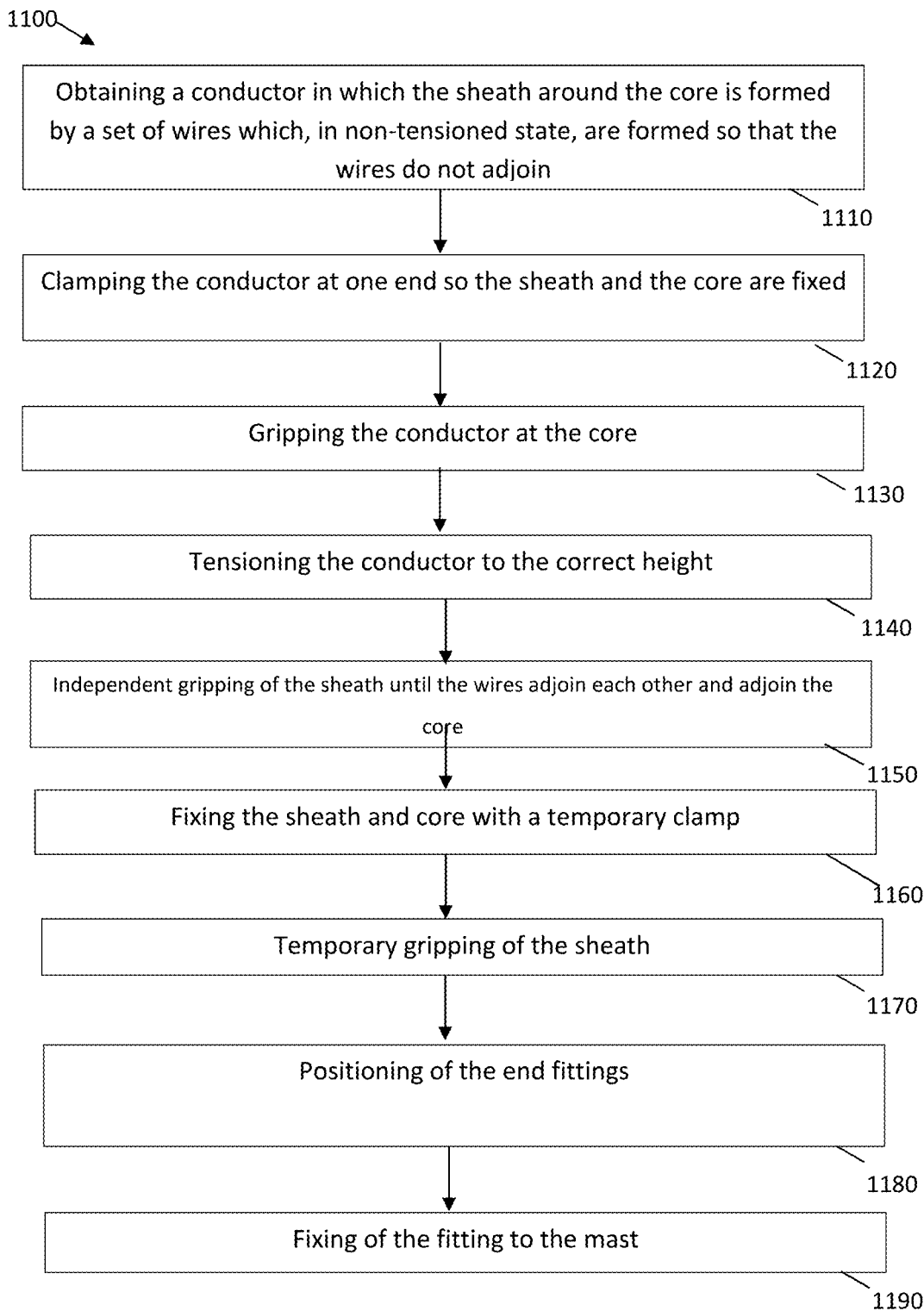

FIG. 11 also describes an alternative installation method. The method 1100 comprises the obtaining 1110 of a conductor, in which the sheath of the core is formed by a set of wires which, in the non-tensioned state, are formed such that the wires do not adjoin. The method 1100 also comprises the clamping 1120 of the conductor at one end so that the sheath and the core are fixed. In step 1130, the conductor is gripped at the core. Then the conductor is tensioned 1140 to the correct height. The method furthermore comprises the independent gripping 1150 of the sheath until the wires adjoin each other and adjoin the core. The method furthermore comprises the fixing 1160 of the sheath and core by a temporary clamp, and the temporary gripping 1170 on the sheath. The method 1100 comprises furthermore the positioning 1180 of the end fittings. In a following step 1190, the fitting is attached to the mast.

Figure 12:
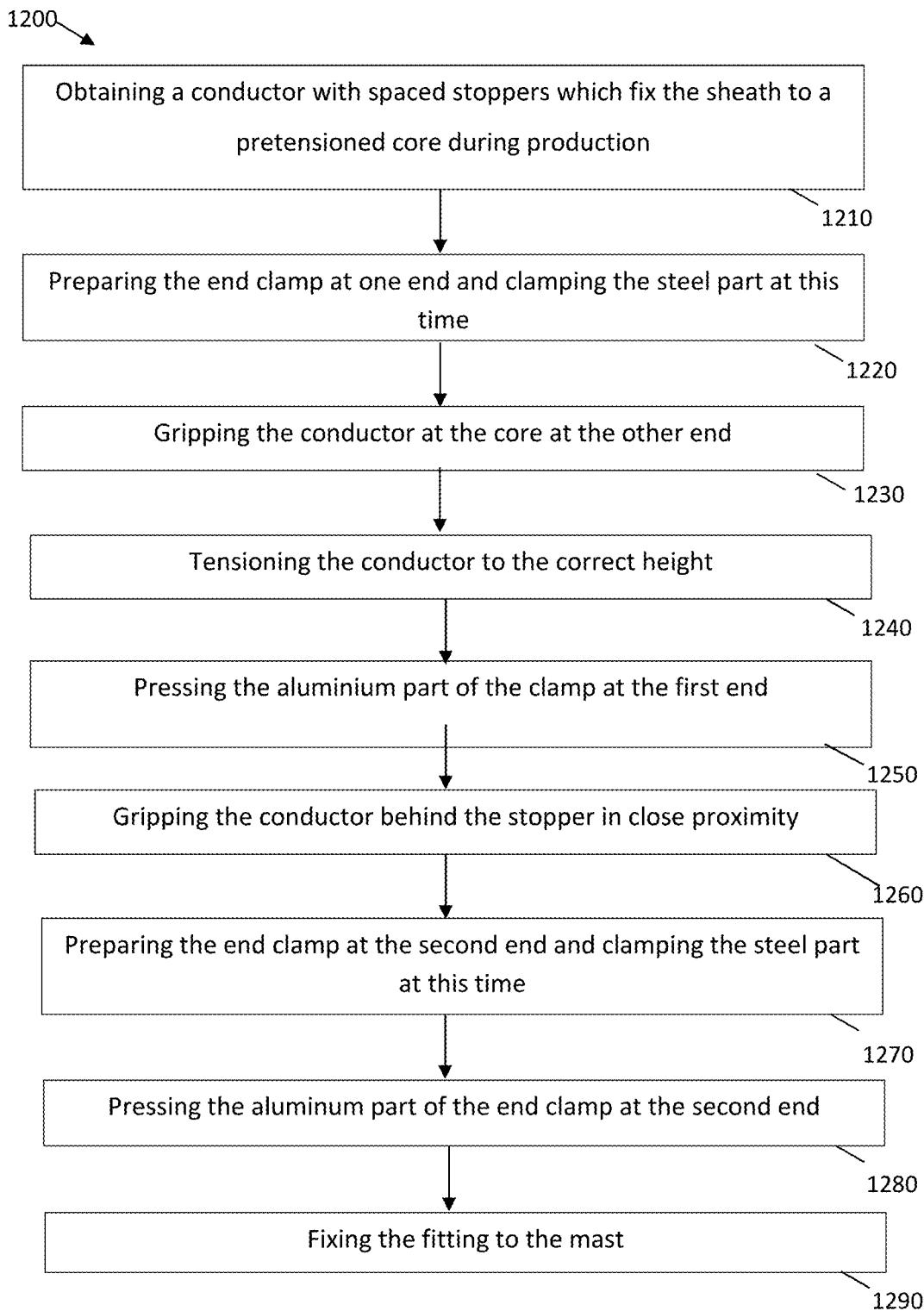

In a final example in FIG. 12, an alternative installation method is again described. The method 1200 comprises the obtaining 1210 of a conductor with spaced stoppers which fix the sheath during production to a pretensioned core. The method 1200 also comprises the preparation 1220 of the end clamp at one end and the clamping of the steel part at this time. In step 1230, the conductor is gripped at the core at the other end (i.e. not where the end clamp is prepared). Then the conductor is tensioned 1240 to the correct height. The method furthermore comprises the pressing 1250 of the aluminium part of the clamp on the first end. The method also comprises the gripping 1260 of the conductor behind the stopper in close proximity. The method also comprises the preparation 1270 of the end clamp on the second end and the clamping of the steel part at this time. In step 1280, the aluminium part of the end clamp is pressed on the second end. In a following step 1290, the fitting is attached to the mast.

In another aspect, the present invention concerns a method for repairing a break in a conductor for overhead energy transport, wherein the conductor comprises various clamping pieces on the conductor which are not situated at the end points of the conductor. The method here comprises the step of replacing a part of the conductor between the clamping pieces and/or stoppers between which the break in the conductor has occurred. The method may for example comprise the removal of the damaged piece of conductor, and the positioning of a new piece of conductor between the two clamping pieces and/or stoppers. One advantage of this method is that the core and the sheath can move relative to each other at most over the length between two clamping pieces and/or stoppers. If no intermediate clamping pieces and/or stoppers are provided, the core may slide one whole end into the sheath, whereby the conductor must be cut over a larger length in order to be able to perform the repair.

In yet another aspect, the present invention concerns a conductor. The conductor comprises an elongate core and an elongate sheath which is situated around the elongate core. The conductor furthermore comprises at least one clamping piece and/or stopper which, on use of the conductor, is clamped onto the conductor so that the elongate core and the elongate sheath are attached to each other or immobilised by means of the clamping piece, wherein the at least one clamping piece and/or stopper is not situated at the ends of the conductor at the time of installation. It is an advantage of embodiments of the present invention that the tension difference between the core and the sheath of the conductor is divided over shorter lengths of the cable. This means that the total tension differences are split into smaller tension differences distributed over shorter lengths. In some embodiments, the conductor may also comprise several clamping pieces and/or stoppers which are clamped onto the conductor during use of the conductor, after tensioning and suspension of the conductor. In some embodiments, they are not situated at the ends of the conductor during use of the conductor. In some embodiments, the several clamping pieces are spaced substantially equidistantly over the length of the conductor. In other embodiments, this is avoided to ensure that no additional resonance is introduced. The several clamping pieces and/or stoppers are preferably distributed over the complete length of the conductor. It is an advantage of embodiments of the present invention that the maximum length of the conductor which must be replaced on breakage is limited to the length between two clamping pieces. The elongate sheath may for example consist of a material selected from a copper, copper alloy, aluminium or aluminium alloy, and wherein the elongate core consists of a material selected from an Invar, metal matrix composite, polymer matrix composite, metal or steel. The elongate sheath may be constructed from a set of wires or several sets of wires which are situated in one or more layers around the core. It is an advantage of embodiments of the present invention that the technique may be used independently of the materials used. In some embodiments, the conductor is a gap conductor in which an air gap is provided between the core and the sheath. It is an advantage of embodiments of the present invention that the methods and systems are applicable to the significant class of conductors with an air gap between the core and the sheath, known as gap conductors. At least one but also several of the conductive layers may comprise wires which are trapezoid or Z-shaped, or have another form. Additional layers may also be provided around the sheath so that the conductor forms a cable.

Figure 4:
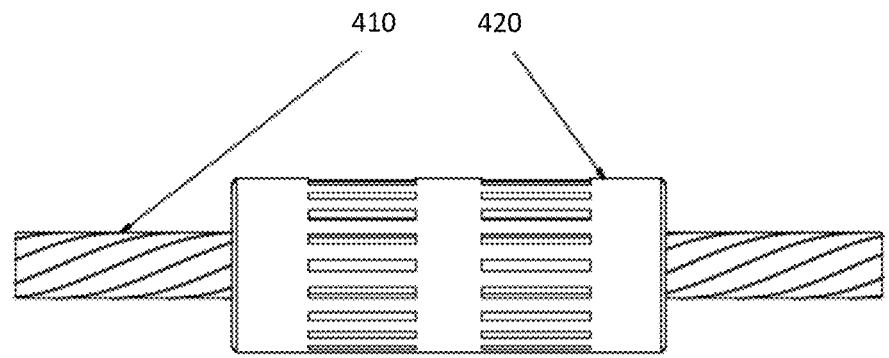
FIG. 4 illustrates a clamping piece on the sheath in mounted state in accordance with embodiments of the present invention.

In yet another aspect, the present invention concerns a clamping piece for use with a conductor for overhead transport. The clamping piece is adapted for fixing, at a position away from the ends of the conductor, an elongate core of the conductor and an elongate sheath of the conductor which is situated around the elongate core. The clamping piece typically has a length of 50 cm or less, for example 30 cm or less. Various embodiments of such clamping pieces are possible. They may be pressed onto the sheath or onto the core. The one or more clamping pieces may correspond to a short version of conventional repair clamping pieces with a bolted clamping piece etc. A diagrammatic depiction of one example of such a clamping pieces shown in FIG. 4, wherein 410 indicates the conductor and 420 the clamp. Another alternative for the clamping pieces which may be used for installation of gap conductors consists of a cylindrical solid material which is placed between the core and the sheath, and one or more clamping straps or a temporary working clamp which is placed over the core and which presses the core and the sheath together at the point where the cylindrical solid material is positioned. The cylindrical solid material may in some cases be introduced during production so that only the clamping straps must be provided. The different types of clamping pieces may be used in one or more of the other aspects described.

In yet another aspect, the present invention concerns the use of a clamping piece from the previous aspect for distributing tension differences between the core and the sheath over different parts of a conductor.

The various aspects may easily be combined with each other and the combinations thus also correspond to embodiments according to the present invention.

The invention claimed is:

1. A method for positioning a conductor for overhead energy transport, comprising:
    obtaining a conductor with an elongate core and an elongate sheath situated around the elongate core,
    wherein the method comprises the step of immobilizing the elongate sheath on the elongate core at a position which, on installation, is not situated at the ends of the conductor at a suspension point, by means of at least one clamping piece,
    wherein the immobilization takes place by means of at least one clamping piece or stopper on the conductor, wherein a tension difference is present between the core and the sheath of the conductor when the conductor is in use.

2. A method according to claim 1, wherein the method comprises the step of immobilization by means of at least two clamping pieces and/or stoppers, wherein the several clamping pieces are not situated at the ends of the conductor on installation.

3. A method according to claim 2, wherein the several clamping pieces and/or stoppers are spaced substantially equidistantly over the length of the conductor.

4. A method according to claim 1, wherein the step of immobilizing the elongate sheath on the elongate core at a position not at the ends of the conductor takes place during production of the conductor.

5. A method according to claim 4, wherein the conductor comprises an air gap between the elongate core and elongate sheath, and wherein for immobilization during production, the elongate core is first brought to tension or
    wherein in the resulting conductor, in non-tensioned state, the sheath is pushed away from the core by means of a filler in a gap between the core and the sheath, or the sheath consists of a set of wires formed such that the wires do not adjoin, and
    wherein for immobilization during production, the elongate core is not first brought to tension.

6. A method according to claim 1, wherein the step of immobilizing the elongate sheath on the elongate core at a position not at the ends of the conductor takes place during installation of the conductor.

7. A method according to claim 1, wherein the immobilization comprises the use of a stopper arranged on the core or wherein the immobilization comprises the use of a clamp arranged on the sheath.

8. A method according to claim 1, wherein the method comprises:
    clamping a conductor at a first end in order to fix the elongate core and the elongate sheath,
    tensioning the elongate core at the second end of the conductor by means of a temporary clamp, until the conductor hangs at the correct height,
    after the elongate sheath has come to rest, fixing the elongate sheath to the elongate core,
    cutting the cable to length, and
    positioning an end clamp for final fixing of the conductor at the second end.

9. A method according to claim 8, in which the fixing of the elongate sheath to the elongate core at a position not at the ends of the conductor takes place after the elongate sheath has come to rest.

10. A method according to claim 1, wherein in the resulting conductor, in non-tensioned state, the sheath is pushed away from the core by means of a filler in a gap between the core and the sheath, wherein the method comprises:
    clamping a conductor at a first end in order to fix the elongate core and the elongate sheath,
    gripping the elongate sheath at the second end and cutting the conductor to the correct length,
    final clamping of the elongate core and the elongate sheath at the second end of the conductor, and tensioning the conductor until the wires of the sheath adjoin.

11. A method according to claim 10, wherein the above-mentioned fixing by means of at least one clamping piece not at a position at the ends of the conductor takes place before the tensioning of the conductor or after tensioning of the conductor.

12. A method according to claim 1, wherein in the resulting conductor, in non-tensioned state, the sheath consisting of a set of wires is formed such that the wires do not adjoin, the method comprising:
    clamping a conductor at a first end in order to fix the elongate sheath to the elongate core,
    unrolling the conductor, gripping the elongate sheath and the core, and tensioning the conductor until the wires of the sheath neatly adjoin, in order to determine the correct length of the conductor, and cutting the conductor to the correct length in the non-tensioned state, and
    final clamping of the elongate core and the elongate sheath at the second end of the conductor, and tensioning the conductor until the wires of the sheath neatly adjoin again.

13. A method according to claim 12, wherein before determining the correct length of the conductor, the sheath and the core are fixed after tensioning by means of a bush and/or wherein the above-mentioned fixing by means of at least one clamping piece not at a position at the ends of the conductor takes place before the tensioning of the conductor or after the tensioning of the conductor.

14. A method for repairing a break in the conductor for overhead energy transport, wherein the conductor comprises various clamping pieces on the conductor which are not situated at the end suspension points of the conductor,
    wherein the various clamping pieces are situated on a conductor, and not at the end suspension points
    wherein a tension difference is present between the core and the sheath of the conductor when the conductor is in use, and
    wherein the method comprises the step of replacing a part of the conductor between the clamping pieces between which the break in the conductor has occurred.

15. A method for repair according to claim 14, wherein the method comprises:
   removal of the damaged piece of conductor, and
   positioning of a Previously Presented piece of conductor between the two clamping pieces.

16. A conductor for overhead energy transport, the conductor comprising:
   an elongate core and an elongate sheath situated around the elongate core,
   several clamping pieces which, on use of the conductor, are clamped on the conductor such the elongate core and the elongate sheath are attached to each other by the clamping pieces, wherein the several clamping pieces are not situated at the ends of the conductor at suspension points,
   wherein the clamping pieces are situated on the conductor, wherein a tension difference is present between the core and the sheath of the conductor when the conductor is in use.

17. A conductor according to claim 16, wherein the several clamping pieces are spaced substantially equidistantly over the length of the conductor and/or wherein an air gap is provided between the core and the sheath.

18. A conductor according to claim 16, wherein the elongate sheath consists of a material selected from a copper, copper alloy, aluminum or aluminum alloy, and
   wherein the elongate core consists of a material selected from an Invar, metal matrix composite, polymer matrix composite, metal or steel and/or wherein the elongate sheath consists of one or more layers of conductive wires and/or
   wherein the elongate sheath consists of one or more layers of conductive wires comprising wires which are trapezoid or Z-shaped, or have another round form.

19. A conductor according to claim 16, wherein additional layers are provided around the sheath so that the conductor forms a cable.

20. A clamping piece for distributing tension differences between the core and the sheath of a conductor for overhead energy transport over different pieces of a conductor when the conductor is in use,
   wherein the clamping piece is adapted for fixing, at a position away from ends of suspension points of the conductor, an elongate core of the conductor and an elongate sheath of the conductor situated around the elongate core,
   wherein the clamping piece has a length of 50 cm or less, for example 30 cm or less.

* * * * *